United States Patent
Buchmann

(10) Patent No.: US 7,565,616 B2
(45) Date of Patent: Jul. 21, 2009

(54) SYSTEM FOR CONTROLLING DISPLAY CONTENT FOR MULTIPLE ELECTRONIC DISPLAY UNITS

(75) Inventor: Gregory J. Buchmann, Sterling Heights, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 11/445,886

(22) Filed: Jun. 2, 2006

(65) Prior Publication Data

US 2007/0283285 A1    Dec. 6, 2007

(51) Int. Cl.
  *G06F 3/00* (2006.01)
  *G06F 9/00* (2006.01)
  *G06F 17/00* (2006.01)
(52) U.S. Cl. .................. 715/763; 715/762; 715/765; 715/835
(58) Field of Classification Search .......... 715/762, 715/763, 764, 835, 908, 773, 757, 758, 753, 715/748
See application file for complete search history.

(56) References Cited

U.S. PATENT DOCUMENTS

| | | | | |
|---|---|---|---|---|
| 2002/0051958 | A1* | 5/2002 | Khalsa | 434/238 |
| 2002/0167460 | A1* | 11/2002 | Baudisch et al. | 345/3.3 |
| 2004/0113419 | A1* | 6/2004 | Silvestri | 283/56 |
| 2004/0113935 | A1 | 6/2004 | O'Neal et al. | 345/732 |
| 2004/0153804 | A1* | 8/2004 | Blevins et al. | 714/33 |
| 2005/0010638 | A1* | 1/2005 | Richardson et al. | 709/204 |
| 2005/0011846 | A1* | 1/2005 | Stein | 211/169 |
| 2006/0244724 | A1* | 11/2006 | Erickson | 345/163 |

FOREIGN PATENT DOCUMENTS

| | | | | |
|---|---|---|---|---|
| GB | 2333391 A | * | 7/1999 | |
| WO | WO 97/11449 | | 3/1997 | |
| WO | WO 2005/109122 A1 | | 5/2005 | |

OTHER PUBLICATIONS

9X Media, *Expand Your Vision*, 15 pages, Copyright date 2001-2004.
Notification of Transmittal of the International Search Report or the Declaration No. PCT/US2007/067675, filed Apr. 27, 2007 (17 pages).
Pacific Digital, MV800 Digital Photo Frame, 4 pages. http://www.pacificdigital.com/products.asp?gpcid=6&cid=34&scid=140&ItemID=791, Jan. 15, 2006.

* cited by examiner

*Primary Examiner*—Tadesse Hailu
*Assistant Examiner*—Anita D Chaudhuri

(57) ABSTRACT

According to one embodiment, a system for controlling display content for multiple electronic displays includes software operable to generate a graphical user interface (GUI) and control instructions. The GUI includes a plurality of virtual display unit icons and a plurality of display content icons, each of the display content icons corresponding with a display content file and each of the display content icons being operable to be selected and positioned within the GUI. Particular virtual display unit icons may be associated with particular display content icons according to the position of the particular display content icons within the GUI. The control instructions are adapted to define display content for a display group comprising a plurality of electronic display units, such that the display content for a particular display unit corresponds with the display content associated with a virtual display unit icon for the particular display unit.

16 Claims, 6 Drawing Sheets

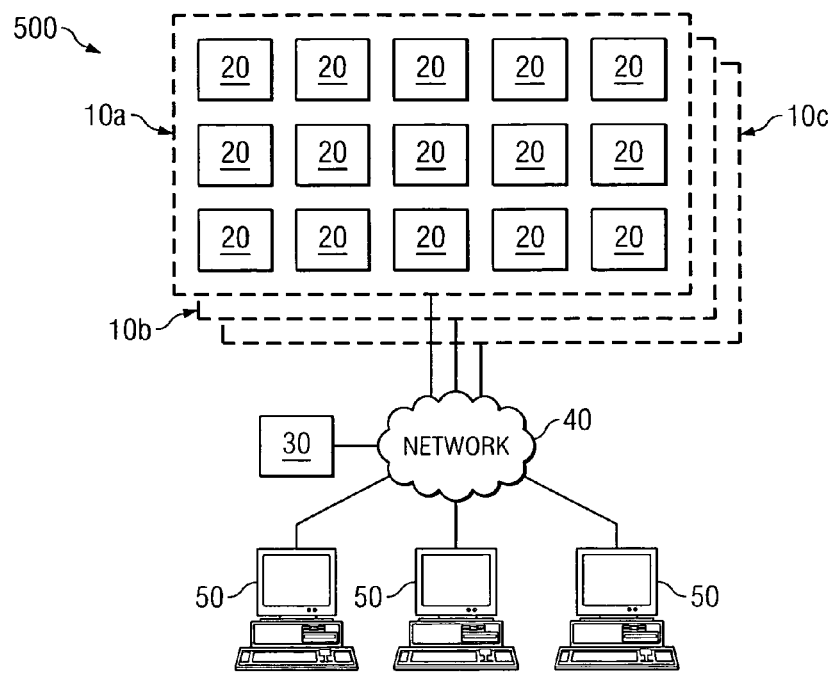
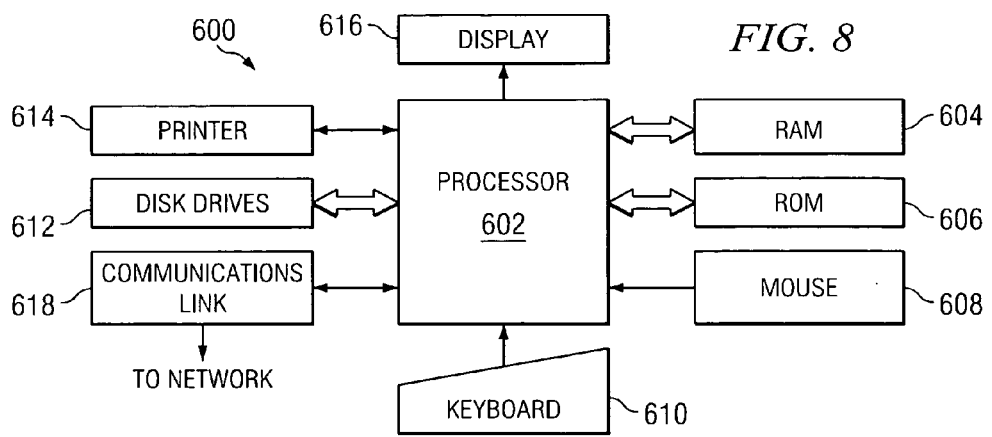

SYSTEM FOR CONTROLLING DISPLAY CONTENT FOR MULTIPLE ELECTRONIC DISPLAY UNITS

TECHNICAL FIELD OF THE INVENTION

This invention relates generally to electronic display systems and more particularly to a system controlling display content for multiple electronic display units.

BACKGROUND OF THE INVENTION

A variety of industries benefit from the use of storyboard walls to visualize, develop, and track various physical configurations, processes, or sequences of events. For example, in manufacturing related industries storyboard walls are created to assist in the planning of assembly processes, in designing assembly facilities, in line balancing and line speed studies, etc. Some existing storyboard wall systems utilize numerous paper diagrams that can be pinned or otherwise positioned on a conference room wall or corkboard. Each diagram may represent a process step, operation, or piece of equipment. Using these paper diagrams, the sequence, configuration, or process flow may be modified by physically moving, replacing, modifying or reorganizing the paper diagrams on the wall or corkboard.

SUMMARY OF THE INVENTION

According to one embodiment, a system for controlling display content for multiple electronic displays includes software operable to generate a graphical user interface (GUI) and control instructions. The GUI includes a plurality of virtual display unit icons and a plurality of display content icons, each of the display content icons corresponding with a display content file and each of the display content icons being operable to be selected and positioned within the GUI. Particular virtual display unit icons may be associated with particular display content icons according to the position of the particular display content icons within the GUI. The control instructions are adapted to define display content for a display group comprising a plurality of electronic display units, such that the display content for a particular display unit corresponds with the display content associated with a virtual display unit icon for the particular display unit.

Certain embodiments of the present invention may provide various technical advantages. For example, certain embodiments may allow a system user to control display content across multiple electronic displays from a single controller. As another example, certain embodiments may allow more than one system user to exchange control of display content across multiple electronic displays from multiple controllers. As yet another example, certain embodiments may allow one or more system users to simultaneously or sequentially control content for multiple groups of electronic displays that may or may not be geographically distributed. As still another example, certain embodiments may allow one or more system users to quickly and easily change the display content for multiple electronic displays. These embodiments may allow for improved communication of information such as, for example, during a conference, brainstorming meeting, etc. Such embodiments may provide significant time, content, and coordination advantages over prior art systems including but not limited to paper systems.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIGS. 7A and 7B illustrate example systems for controlling display content for multiple groups of example electronic displays; and FIG. 8 illustrates an example embodiment of a general purpose computer.

DETAILED DESCRIPTION OF THE INVENTION

It should be understood at the outset that although example implementations of embodiments of the invention are illustrated below, the present invention may be implemented using any number of techniques, whether currently known or not. The present invention should in no way be limited to the example implementations, drawings, and techniques illustrated below.

Before describing the invention in detail, it may be helpful to consider a general overview of the invention. This general overview should not be considered to be limiting but instead to highlight various aspects of certain embodiments of the invention. Various embodiments of the invention may allow a system user to define the display content for multiple electronic displays. The electronic displays may be monitors, flat panel displays, tablet PCs, etc. The display content may be in the form of one or more pictures, one or more charts, one or more text elements, a combination of one or more of these, and/or any other appropriate visual content. The system user may also utilize the system to add, remove, reorganize, or modify display content for the multiple display units. Various embodiments may also allow multiple system users to exchange control of the display content for multiple electronic displays.

Figure 1A:
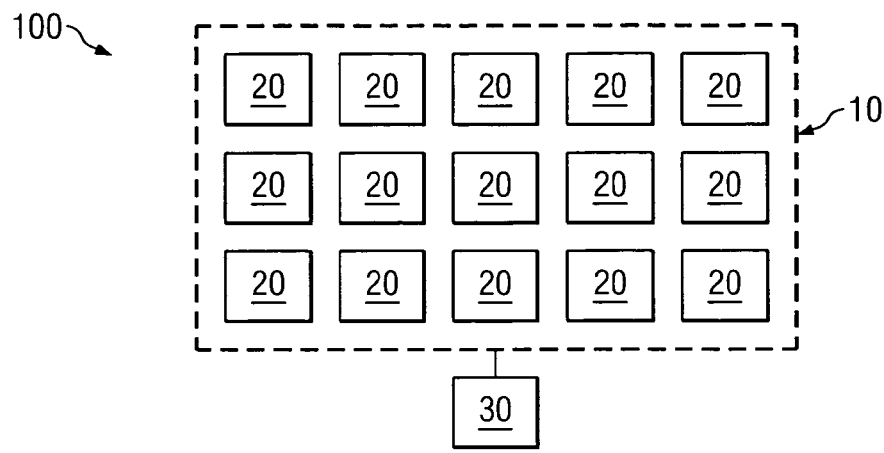
FIGS. 1A and 1B illustrate example systems for controlling display content for multiple electronic displays.
Figure 1B:
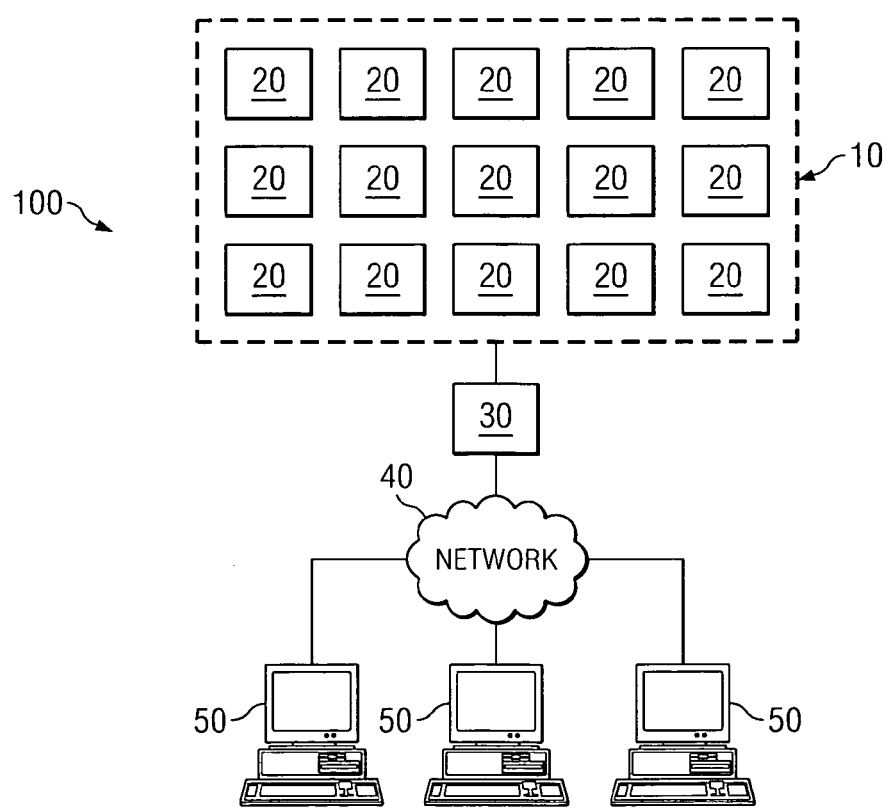

FIGS. 1A and 1B illustrate example systems 100 for controlling display content for multiple electronic displays. As shown in FIG. 1A, in certain embodiments, system 100 includes display group 10 and local controller 30. Display group 10 represents a collection of electronic display units 20. Each electronic display unit 20 represents an electronic device capable of displaying a digital image. For example, display unit 20 may be a computer monitor, such as a CRT, flat-panel or plasma monitor. Typically, a display unit will have its own housing or chassis. As another example, display unit 20 may be a digital photo frame, such as a model MF-810SW Wireless Memory Frame, available from Pacific Digital of Irvine, Calif. As yet another example, display unit 20 may be a tablet-type computer. One or more displays may or may not have touch-screen capability. In certain embodiments, each display unit 20 may have its own operating system and, in certain embodiments, each display unit 10 may include its own input device. For example, in embodiments in which display unit 20 is a tablet-type computer, the tablet-type computer may be running its own operating system, such as Windows XP Tablet PC Edition available from Microsoft Corporation, and may utilize touch-screen technology as an input device.

In certain embodiments, display group 10 may represent a collection of display units 20, mounted in a substantially planar array. For example, a collection of display units 20 may be mounted in a pattern of columns and rows on a conference room wall with each display unit 20 being positioned one meter or less from another display unit 20. Alternatively, rather than being mounted on a wall, display unit 20 may also be mounted on a free standing frame. In these embodiments, display group 10 may be utilized to aid in managing, organizing, and/or conveying information during a meeting or conference. Display group 10 may also be used for any other purpose.

In certain embodiments, local controller 30 may represent an electronic device (or group of devices) coupled to display group 10 and capable of controlling the display content for each of the display units 20 within display group 10. Although local controller 30 may couple to display group 10 using any appropriate means, in certain embodiments, local controller 30 may couple to display group 10 through the use of wireless or wireline network connections. For example, local controller 30 may couple to display group 10 through wireless transmissions using the 802.11 family of wireless standards.

As shown in FIG. 1B, in certain embodiments, system 100 may also include one or more distributed controllers 50. In certain embodiments, distributed controller 50 may represent an electronic device coupled to local controller 30 and capable of communicating with local controller 30 to control display content for each display unit 20 within display group 10. In certain embodiments, one or more distributed controllers 50 may be coupled to local controller 30 through network 40.

Network 40 represents communication equipment, including hardware and any appropriate controlling logic, for interconnecting elements coupled to network 40. Thus, network 40 may represent a local area network (LAN), a metropolitan area network (MAN), a wide area network (WAN), and/or any other appropriate form of network. Network 40 may include network elements such as routers, switches, converters, hubs, and splitters. Furthermore, elements within network 40 may utilize circuit-switched, packet-based, or any other type of communication protocol to provide for network services. For example, elements within network 20 may utilize TCP/IP. In addition, elements within network 40 may utilize wireless standards, such as the 802.11 family of wireless standards.

Figure 2:
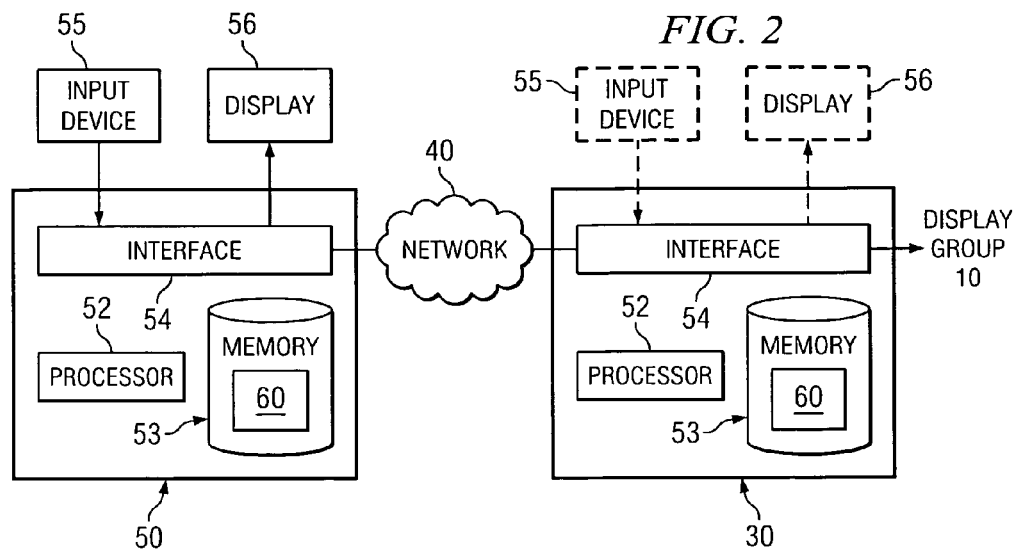
FIG. 2 illustrates example components for use with an example system.

FIG. 2 illustrates example components for use with an example system 100. As shown, distributed controller 50 may include processor 52, memory 53, and interface 54. Distributed controller 50 may be coupled to one or more input devices 55 and displays 56. Similarly, local controller 30 may include processor 52, memory 53, and interface 54. Local controller 30 may or may not be coupled to one or more input devices 55 and one or more displays 56.

In certain embodiments, processor 52 may control the operation and administration of elements within local controller 30 or distributed controller 50 by processing information received from interface 54 and memory 53. Processor 52 may include any hardware and/or controlling logic elements operable to control and process information. For example, processor 52 may be a computer, programmable logic device, a microcontroller, and/or any other suitable device or group of devices.

Memory 53 may store, either permanently or temporarily, data and other information for processing by processor 52 and communication using interface 54. Memory 53 may include any one or a combination of volatile or nonvolatile local or remote devices suitable for storing information. For example, memory 53 may include random access memory (RAM), read only memory (ROM), magnetic storage devices, optical storage devices, or any other suitable information storage device or combination of these devices. Memory 53 may store, among other things, software 60 for use in controlling display content for display group 10. Software 60 stored in memory 53 of local controller 30 may or may not be the same or similar to software 60 stored in memory 53 of one or more distributed controllers 50.

Interface 54 communicates information to and receives information from devices or systems coupled to local controller 30 or distributed controller 50. For example, interface 54 may communicate with input device 55, display 56, network 40, and/or other elements coupled to network 40. Thus interface 54 may include any hardware and/or controlling logic used to communicate information to and receive information from elements coupled to local controller 30 or distributed controller 50.

In operation, local controller 30 controls the display content for display units 20 within display group 10. For example, local controller 30 may generate control instructions for a plurality of display units 20 within display group 10. In certain embodiments, each display unit 20 has a unique IP address within system 100 and the control instructions may be in the form of UDP/IP messages. For example, in particular embodiments, each display unit 20 may be a tablet-type PC with its own IP address that is unique within system 100. In order to change the display content for a particular display unit 20 within display group 10, local controller 30 may generate UDP/IP messages identifying the filename and filepath of selected display content. Local controller 30 may then send the generated UDP/IP messages to the IP address associated with the particular display unit 20.

In certain embodiments, the display content may be in the form of one or more pictures, graphics, charts, text elements, a combination of one or more of these, and/or any other appropriate visual display content. For example, display content may be all or a portion of the output from one or more applications such as a word processor application, spreadsheet or database application, 2D or 3D graphics application, presentation application (i.e. MS PowerPoint), etc. In a more particular example, display content may be in the form of pages of a presentation file, such that each display unit 20 may display a single page of the presentation file. In these embodiments, Such applications may be running on local controller 30, distributed controller, or on another hardware device.

In certain embodiments, the display content may be modified while it is being displayed by a display unit 20. For example, in embodiments in which display unit 20 is a tablet-type PC, changes to the display content may be made using a touch-screen input and then saving the display content file. In alternative embodiments, an application may be opened on local controller 30, distributed controller 50, or on another hardware device. Once opened, this application may be used to modify a display content file. Once modified, the display content on a display unit 20 may be updated to reflect the modifications. In certain embodiments, the update may occur automatically. In alternative embodiments, the update may occur in response to user input via local controller 30 or distributed controller 50.

In particular embodiments, the display content for each display unit 20 of display group 10 is in the form of a static visual image, such that each display unit 20 of display group 10 may display a different static visual image. In these embodiments, in many situations, no two display units 20 of display group 20 would display the same display content at the same time. For example, each display unit 20 may display a different step in a process flow or a representation of a different physical location within a facility layout. As another example, each display unit 20 may display a different image, such that all of the images together collectively tell a story, communicate a message, or depict an event or activity.

Figure 3:
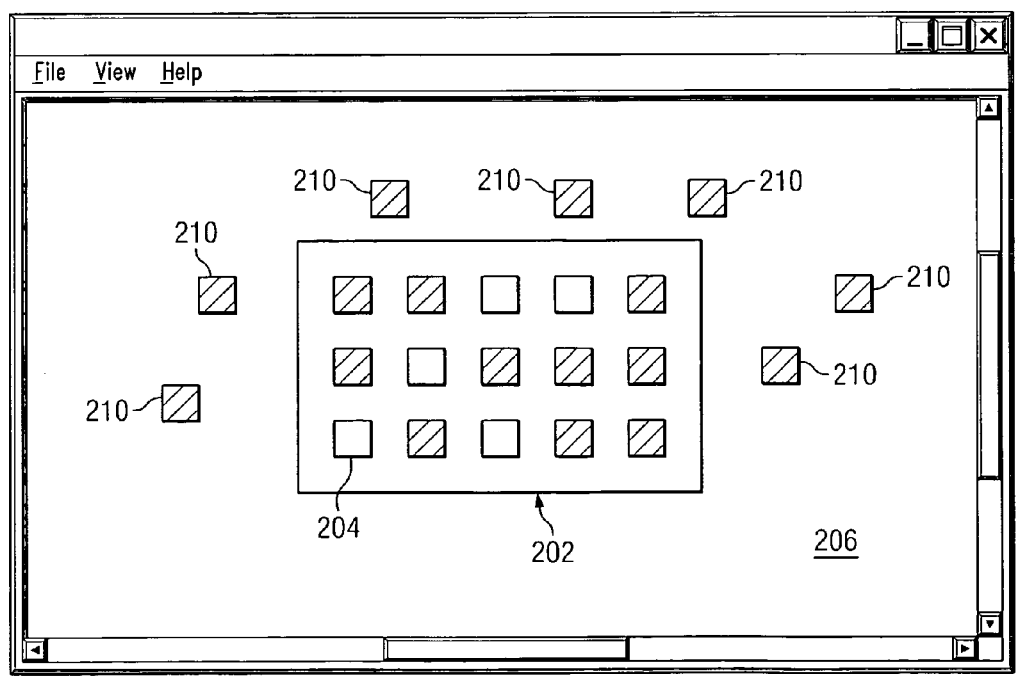
FIG. 3 illustrates an example graphical user interface.

In certain embodiments, user interaction with software 60 may be facilitated through the use of a graphical user interface. FIG. 3 illustrates an example graphical user interface 200, generated by and/or used together with software 60. As shown in FIG. 3, graphical user interface 200 may include a window with a virtual wall area 202 and a holding area 206. Virtual wall area 202 may include multiple virtual display unit icons 204. Some or all of virtual display unit icons 204 may be associated with display units 20 in display group 10. Graphical user interface 200 may also include multiple display content icons 210. Each display content icon 210 may represent particular display content that may be displayed on a display unit 20 within display group 10.

In certain embodiments, each display content icon 210 may be a thumbnail image of the display content that may be displayed on a display unit 20. In these embodiments, the thumbnail image may provide a visual indication of the associated display content. In a particular embodiment, each display content icon 210 may be in the form of a rectangular thumbnail image, with the bottom left corner of the image appearing to be bent forward to generate the impression that the thumbnail image is a piece of paper. This embodiment may be utilized to convey the look and feel of a pin-up board with numerous pieces of paper that may be positioned on the board to collectively communicate a particular message.

In operation, according to certain embodiments, a user may interact with graphical user interface 200 to associate display content icons 210 with one or more virtual display unit icons 204. For example, multiple display content icons 210 may initially be positioned within holding area 206. A user may use a keyboard, mouse, or other input device to position a particular display content icon 210 on a particular virtual display unit icon 204 (or in certain embodiments, a particular display content icon 210 may span multiple display unit icons 204). The positioning of display content icon 210 may be performed through a "drag-and-drop" operation and in certain embodiments, display content icon 210 may "snap" to a particular display unit icon 204 once display content icon 210 is positioned within a prescribed distance from the particular display unit icon. The user may continue to associate selected display content icons 210 with particular virtual display unit icons 204. The user may also remove selected display content icons 210 from association with selected virtual display unit icons 204 or change the associations between selected display content icons 210 and selected virtual display unit icons 204.

In operation, the display content for display units 20 within display group 10 may be controlled based on the association of display content icons 210 and virtual display unit icons 204. In particular embodiments, software 60 may generate a command to change the display content on one or more display units 20 based on the association of particular display content icons 210 with particular virtual displays 204. For example, software 60 may generate a command identifying the filename and filepath for display content to be displayed on a particular display unit 20 based on an association between a particular display content icon 210 and a particular virtual display unit icon 204 associated with the particular display unit 20. In certain embodiments, the display content for the display units 20 of display group 10 may be updated each time that a change is made to graphical user interface 200, each time that a particular type of change is made to graphical user interface 200, at particular pre-set or variable time intervals, and/or upon a particular input from a system user. As one example, the display content for the display units 20 of display group 10 may be updated upon the selection of a "refresh" menu command within graphical user interface 200.

In certain embodiments, the functionality of graphical user interface 200 may be provided through an implementation of the SUN JAVA programming language version 1.1. In particular embodiments, a portion of the functionality may be provided through the use of Double Buffered Containers. For example, graphical user interface 200 may be provided as a JAVA Application Frame Container having a MenuBar and a Scrollpane Container. The Scrollpane Container may provide functionality for holding area 206. The Scrollpane Container may contain a Wall Component which may provide functionality for virtual wall area 202. The Wall Component may include Dragger events and a Double Buffered Container. The Double Buffered Container may contain Lightweight Page Components on a Painted Background. The Lightweight Page Components may have Mouse and Dragger events with a Painted Image. Although the particular example embodiment described above sets forth a brief description of an example technique for providing the functionality of graphical user interface 200, those of skill in the art would readily recognize that there are innumerable techniques that may be used to provide this functionality. The invention herein is intended to cover all such techniques, whether or not they are currently known.

As an example, in a particular embodiment, system 100 together with graphical user interface 200 may be utilized to facilitate the planning of a manufacturing process flow. In this example, a conference room may be configured with a display group 10 mounted on a conference room wall. The conference room may include a single local controller 30 for use by a single system user. The system user may identify one or more display content files from which a plurality of display content icons 210 may be generated. This display content may represent numerous process steps required for the manufacture of a particular product. During the conference, the system user or other conference attendees may identify a particular order or configuration for certain of the process steps. Using the graphical user interface 210, the system user may arrange the display content icons 210 and associate certain display content icons 210 with certain display unit icons 204 to reflect the particular order or configuration for those process steps. During the conference, one or more of the process steps may be added, deleted, or re-ordered and the display content may be modified using the graphical user interface to reflect this change. In certain embodiments, during or after the conference, the different orders or configurations of the display content displayed on display group 10 may be captured, stored, and/or printed. For example, once the order of the process steps has been finalized, the system user may print a process flow diagram directly from the user interface, such that the process flow diagram represents the order of the display content displayed on display group 10.

In certain embodiments, the control of display content for display group 10 may be managed through the use of one or more instances of software 60 running on local controller 30, distributed controller 50, or on local controller 30 and one or more distributed controllers 50. In a particular embodiment, multiple instances of software 60 may be running on local controller 30. In these embodiments, one instance of software 60 may have control of the display content of display group 10, while the remaining one or more instances of software 60 may be maintained and operated without control. In an alternative embodiment, one or more instances of software 60 may be running on local controller 30 and one or more instances of software 60 may be concurrently running on one or more distributed controllers 50. In these embodiments, one instance of software 60 running either on the local controller 30 or a distributed controller 50 may have control of the display content of display group 10, while the remaining one or more instances of software 60 may be maintained and operated without control. Each instance of software 60 may or may not monitor whether there are other instances of software 60 running or which instance of software 60 currently has control.

Figure 4:
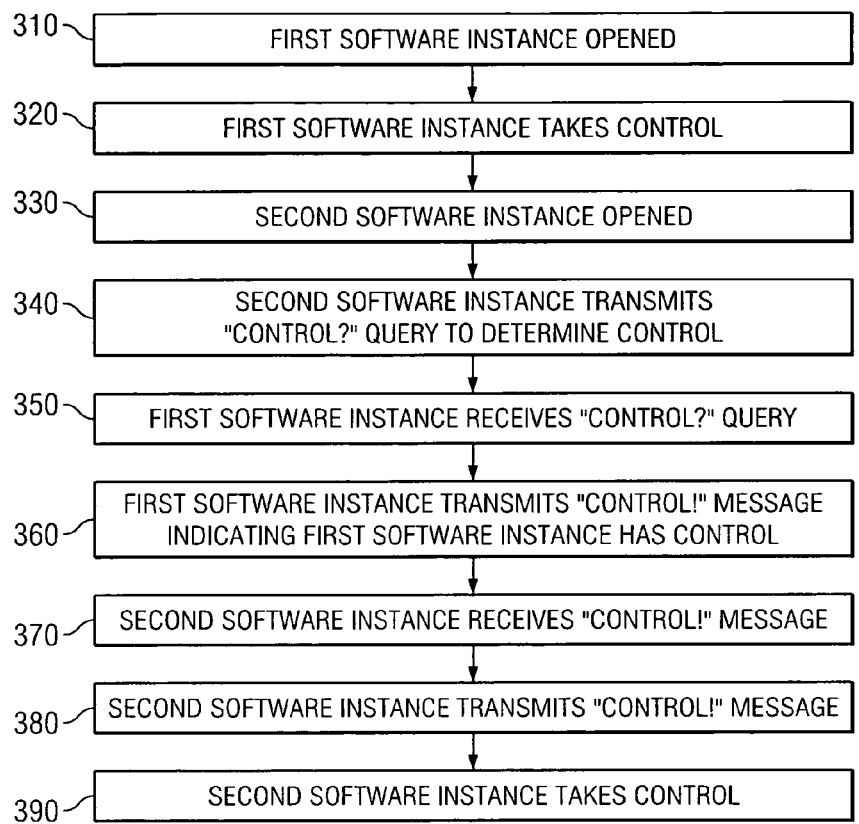
FIG. 4 illustrates an example method that may be used with multiple instances of software to manage control of display content.

In certain embodiments, multiple instances of software 60 may interact to manage control of display group 10 through the use of network messages. FIG. 4 illustrates an example method 300 that may be used with multiple instances of software 60 to manage control of display content for display group 10. Certain of the steps identified in method 300 may take place simultaneously and/or in a different order than shown. At step 310, a first instance of software 60 is opened. At step 320, the first instance of software 60 takes control of display group 10. At step 330, a second instance of software 60 is opened. At step 340, the second instance of software 60 transmits a "CONTROL?" query to determine whether another instance of software 60 has control. At step 350, the first instance of software 60 receives the "CONTROL?" query from the second instance of software 60. At step 360, the first instance of software 60 transmits a "CONTROL!" message indicating that the first instance has control. At step 370, the second instance of software 60 receives the "CONTROL!" message from the first instance of software 60. At step 380, the second instance of software 60 transmits a "CONTROL!" message requesting control of display group 10. In certain embodiments, the transmission of a "CONTROL!" message by the second instance of software 60 may be in response to input by a system user. For example, a system user may select a "take control" command from a drop-down menu item in graphical user interface 200. At step 390, the second instance takes control of display group 10. In certain embodiments, prior to the second instance taking control, the first instance must transmit a message releasing control. In particular embodiments, releasing control may be mandatory following a request for control by another instance. In alternative embodiments, releasing control may be discretionary to some or all instances/system users. According to certain embodiments, only a single instance of software 60 may have control of display group 10 at any one time. Although not shown, in certain embodiments, different instances of software 60 may simultaneously have control of different display units 20 in display group 10.

In certain embodiments, the messages and queries may be in the form of UDP/IP messages. Although described above, as "CONTROL?" and "CONTROL!" commands, in alternative embodiments, any appropriate message or query may be utilized to communicate the appropriate information between multiple instances of software 60.

In embodiments, in which multiple instances of software 60 are running at the same time, each instance of software 60 that does not have control may continue to utilize graphical user interface 200 to manipulate content icons 210 relative to virtual display unit icons 204. In these embodiments, an instance of software 60 that does not have control may prepare a particular configuration of display content for display group 10 that may take effect when that instance later takes control. In certain embodiments, one or more content configurations may be stored locally or remotely by one or more instances of software 60.

In certain embodiments, graphical user interface 200 may include the same number of virtual display unit icons 204 in virtual wall area 202 as the number of display units 20 in display group 10. In a particular embodiment, the configuration of the virtual display unit icons 204 in virtual wall area 202 is the same as the configuration of the display units 20 in display group 10. For example, both the virtual display unit icons 204 and the display units 20 may be configured in the same number of rows and columns. In alternative embodiments, graphical user interface 200 may include a greater number of virtual display unit icons 204 in virtual wall area 202 than the number of display units 20 in display group 10. In these embodiments, less than all of the virtual display unit icons 204 in virtual wall area 202 may be designated to associate display content with each display unit 20 in display group 10. For example, this may allow display on display units 20 of a subset of a large process flowchart which can be viewed in its entirety using software 60.

Figure 5A:
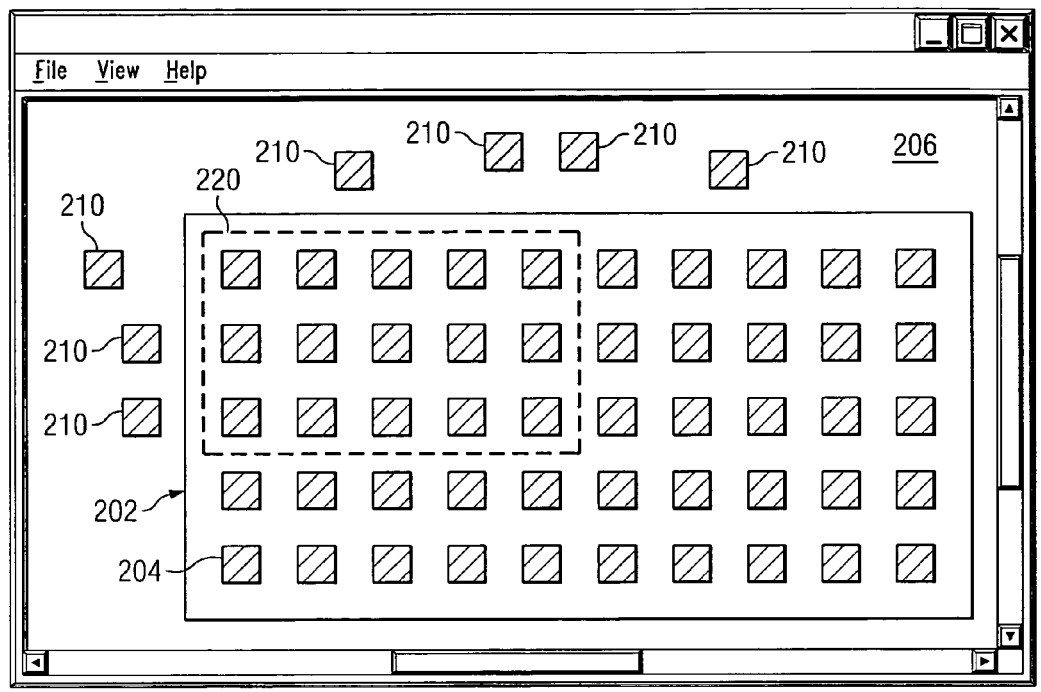
FIGS. 5A and 5B illustrate an example graphical user interface, including an example active view designator.
Figure 5B:
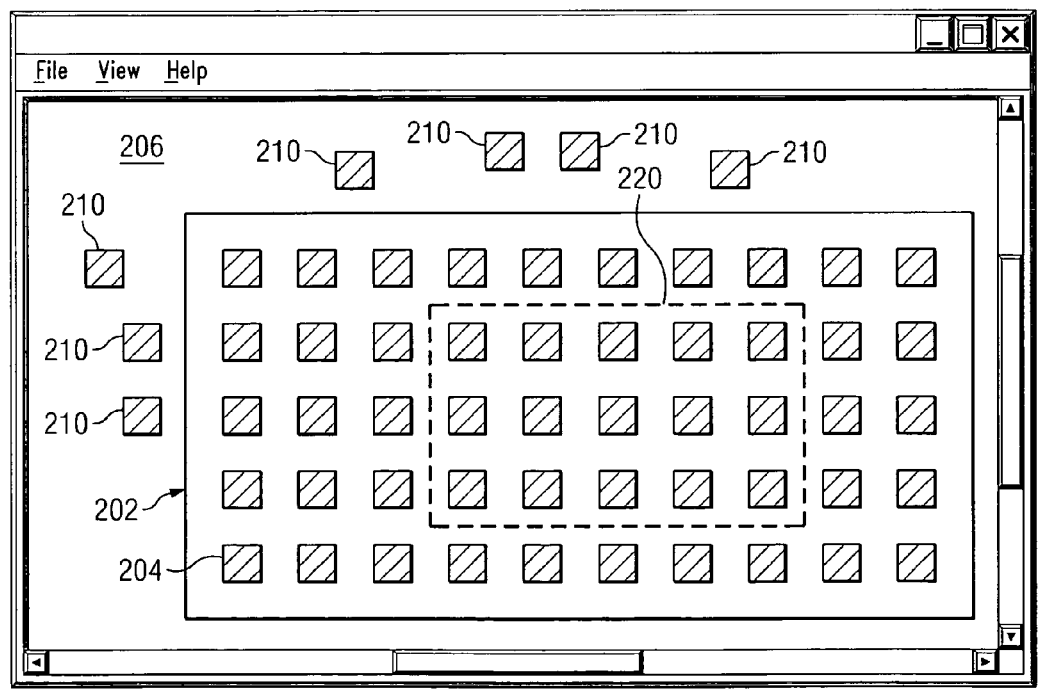

FIGS. 5A and 5B illustrate an example graphical user interface 200, including an active view designator 220. In the embodiment shown, active view designator is a visual indicator that surrounds and highlights the particular virtual display unit icons 204 associated with the display units 20 in display group 10. In these embodiments, the shape of active view designator 220 may be such that it surrounds and highlights a group of virtual display unit icons 204 configured in the same way as the display units 20 in display group 10. For example, if display group 10 includes fifteen display units 20 in three rows of five display units 20 each, then active view designator 220 may be shaped to surround and highlight fifteen virtual display unit icons 204, with three rows of five virtual display unit icons 204 each.

In certain embodiments, a fewer number of virtual display unit icons 204 may be surrounded and highlighted by active view designator 220 than the number of display units 20 in display group 10. Such embodiments may be utilized, for example, to control the display content for less than all of the display units 20 in display group 10 or to display content on only a subset of display units 10.

In a particular embodiment, multiple active view designators 220 may be utilized, with each of the multiple active view designators 220 utilized to control the display content of a portion of the display units 20 in display group. 10. For example, one system user may control the display content for the display units 20 associated with the display unit icons 204 surrounded by a first active view designator 220, while another system user may control the display content for the display units 20 associated with the display unit icons 204 surrounded by a second active view designator 220.

Figure 6:
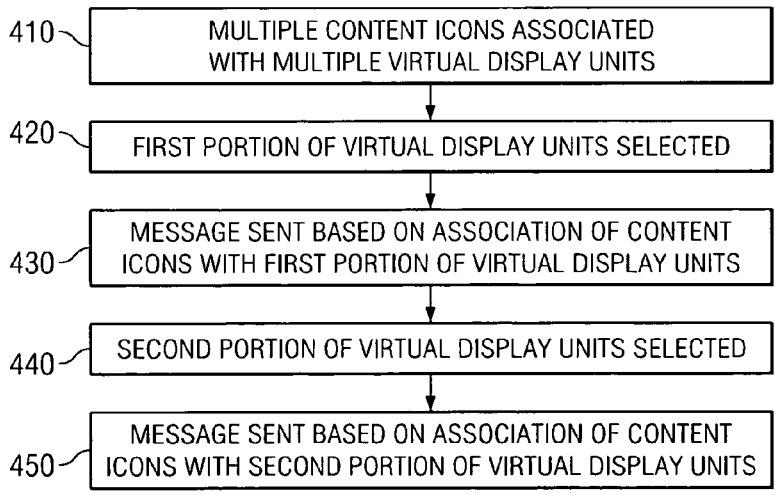
FIG. 6 illustrates an example method for utilizing an example active view manager.

FIG. 6 illustrates an example method 400 for utilizing an example active view manager 220. Certain of the steps identified in method 400 may take place simultaneously and/or in a different order than shown. At step 410, multiple display content icons 210 are associated with multiple virtual display unit icons 204. At step 420, a first portion of the multiple virtual display unit icons 204 are selected with an active view manager 220. At step 430, a message is sent identifying display content for multiple display units 20 based on the association of display content icons 210 with the first portion of virtual display unit icons 204 selected by the active view manager 220. At step 450, active view manager 220 is moved and/or modified to select a second portion of virtual display unit icons 204. At step 460, a message is sent identifying display content for multiple display units 20 based on the association of display content icons 210 with the second portion of virtual display unit icons 204.

Figure 7A:
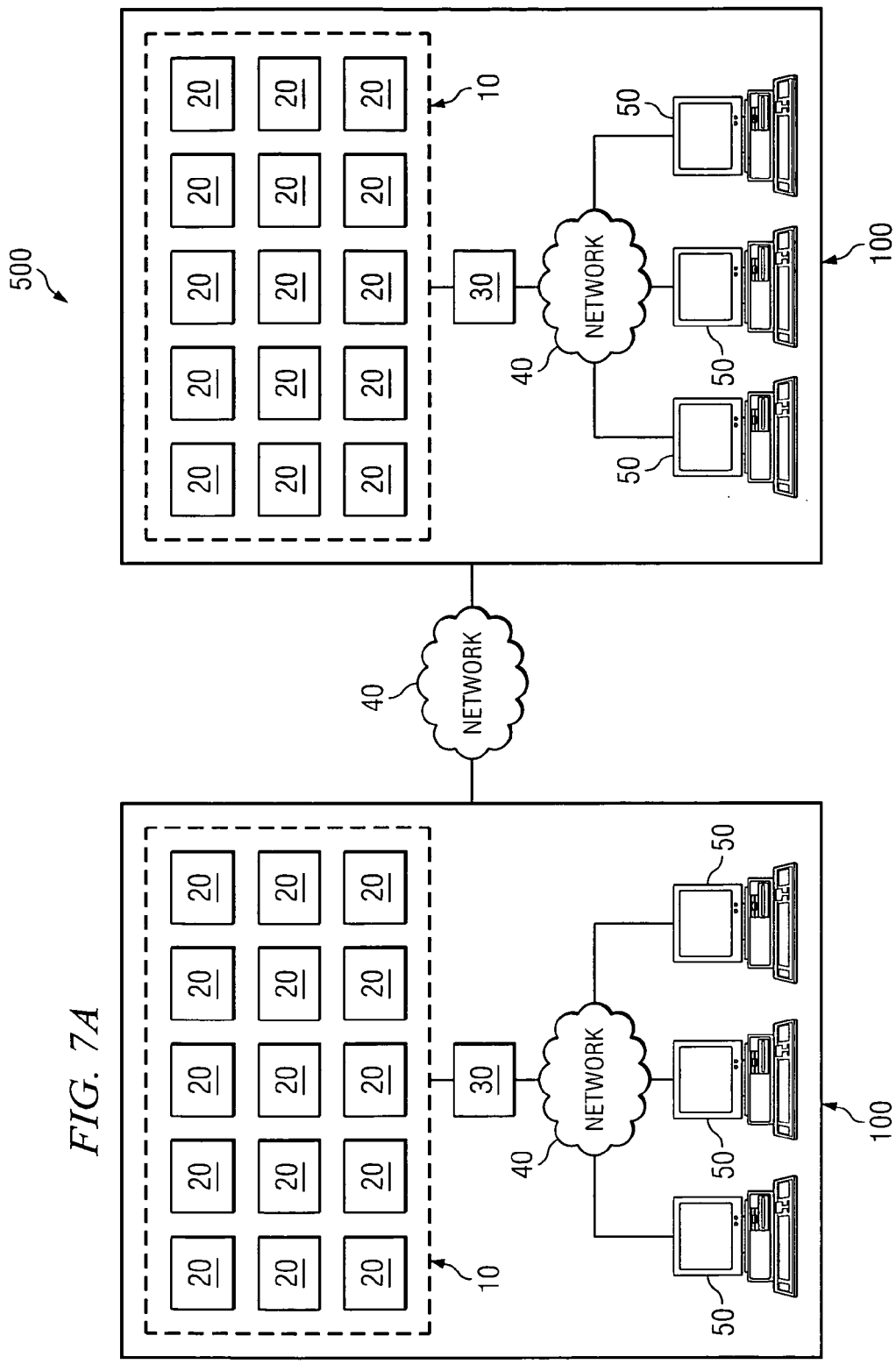

According to certain embodiments, the display content for multiple display groups 10 may be controlled substantially simultaneously. FIGS. 7A and 7B illustrate example systems 500 for controlling display content for multiple display groups 10. As shown in FIG. 7A, system 500 may include multiple systems 100 connected by a network 40. In these embodiments, control for multiple display groups 10 may be managed and shared among one or more of local controllers 30 and distributed controllers 50.

In a particular embodiment, for example, two systems 100 may be geographically separated, with each system 100 being associated with a conference room equipped with display group 10, a local controller 30, and multiple distributed controllers 50. The two systems 100 may be connected by network 40. In this embodiment, a conference call may be established between the two geographically separated conference rooms and participants in the conference call may utilize the local controllers 30 or distributed controllers 50 to control display content on the display groups 10 in both conference rooms to facilitate the communication of information during the conference call.

As shown in FIG. 7B, system 500 may include multiple display groups 10 connected to local controller 30 via network 40. In these embodiments, display content for multiple display groups 10 may be controlled by local controller 30 and/or distributed controller 50. In these embodiments, the multiple display groups 10 may be connected to local controller 30 and one or more distributed controllers 50 via network 40. In certain embodiments, the display groups 10 may be controlled such that the display content is the same for each of the display groups 10. In alternative embodiments, the display groups 10 may be controlled such that the display content for each of the display groups 10 may be different. For example, local controller 30 may be running two instances of software 60, with each instance controlling the display content for a different display group 10.

In particular embodiments, display groups 10 may be geographically distributed in multiple conference rooms. In this embodiment, through the use of system 300, the display content for each of the display groups may be synchronized by a single local controller 30 or distributed controller 50.

FIG. 8 illustrates an example embodiment of a general purpose computer that may be used in connection with one or more pieces of software used to implement the invention. General purpose computer 600 may generally be adapted to execute any of the well-known OS2, UNIX, MAC-OS, LINUX, and WINDOWS Operating Systems or other operating systems. The general purpose computer 600 in this embodiment comprises a processor 602, a random access memory (RAM) 604, a read only memory (ROM) 606, a mouse 608, a keyboard 610 and input/output devices such as a printer 614, disk drives 612, a display 616 and a communications link 618. In other embodiments, the general purpose computer 600 may include more, less, or other component parts. Embodiments of the present invention may include programs that may be stored in the RAM 604, the ROM 606 or the disk drives 612 and may be executed by the processor 602. The communications link 618 may be connected to a computer network or a variety of other communicative platforms including, but not limited to, a public or private data network; a local area network (LAN) ; a metropolitan area network (MAN) ; a wide area network (WAN) ; a wireline or wireless network; a local, regional, or global communication network; an optical network; a satellite network; an enterprise intranet; other suitable communication links; or any combination of the preceding. Disk drives 612 may include a variety of types of storage media such as, for example, floppy disk drives, hard disk drives, CD ROM drives, DVD ROM drives, magnetic tape drives, or other suitable storage media.

Although FIG. 8 illustrates one embodiment of a computer that may be used with the invention, the invention may additionally utilize computers other than general purpose computers as well as general purpose computers without conventional operating systems. Additionally, embodiments of the invention may also employ multiple general purpose computers 600 or other computers networked together in a computer network. Most commonly, multiple general purpose computers 600 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 8, the logic comprises computer software executable on the general purpose computer 600. The medium may include the RAM 604, the ROM 606 or the disk drives 612. In other embodiments, the logic may be contained within hardware configurations or a combination of software and hardware configurations. The logic may also be embedded within any other suitable medium without departing from the scope of the invention.

Although the present invention has been described in several embodiments, a plenitude of changes and modifications may be suggested to one skilled in the art, and it is intended that the present invention encompass such changes and modifications as fall within the present appended claims.

To aid the Patent Office, and any readers of any patent issued on this application in interpreting the claims appended hereto, applicant wishes to note that he does not intend any of the appended claims to invoke ¶6 of 35 U.S.C. § 112 as this paragraph and section exists on the date of filing hereof unless "means for" or "step for" are used in the particular claim.

What is claimed is:

1. A system comprising:

a display group comprising a plurality of electronic display units, each for displaying a digital image;

a controller comprising one or more processors and one or more computer-readable tangible media encoding one or more instructions that, when executed collectively by the processors;

generate a graphical user interface comprising:

a plurality of virtual display unit icons, one or more of the virtual display unit icons each corresponding to a particular electronic display unit; and a plurality of display content icons, each of the display content icons corresponding to a display content file and representing one or more steps or processes in a manufacturing process flow, one or more of the display content icons being user selectable and positionable within the graphical user interface with respect to one or more of the virtual display unit icons; and in response to a user positioning a plurality of particular virtual display unit icons each within a predetermined distance of a particular display content icon within the graphical user interface, generate one or more control instructions for defining display content for each of the particular electronic display units corresponding to the particular virtual display unit icons that corresponds to the particular display content icons associated with the particular virtual display unit icons, a combined display content for the particular electronic display units presenting at least a portion of a manufacturing process flow.

2. The system of claim 1, wherein the display group is configured in a substantially planar array, with each of the plurality of electronic display units being positioned approximately one meter or less from at least one other electronic display unit within the display group.

3. The system of claim 1, wherein each of the plurality of electronic display units within the display group comprises a tablet-type computer having its own operating system and its own IP address unique within the system.

4. An system comprising:
one or more processors; and
one or more computer-readable tangible media encoding one or more instructions that, when executed collectively by the processors;
generate a graphical user interface comprising:
a plurality of virtual display unit icons, one or more of the virtual display unit icons each corresponding to a particular one of an electronic display unit in a display group comprising a plurality of electronic display units for displaying a digital image; and
a plurality of display content icons, each of the display content icons corresponding to a display content file, one or more of the display content icons being user selectable and positionable within the graphical user interface with respect to one or more of the virtual display unit icons; and
in response to a user positioning a plurality of particular virtual display unit icons each within a predetermined distance of a particular display content icon within the graphical user interface, generate one or more control instructions for defining display content for each of the particular electronic display units corresponding to the particular virtual display unit icons that corresponds to the particular display content icons associated with the particular virtual display unit icons.

5. The system of claim 4, wherein the one or more instructions, when executed collectively by the processors, further generate and store a file representing the associations between the display unit icons and the display content icons.

6. The system of claim 4, wherein the display content for a particular display unit comprises a single page from a file generated using a word processor application or a presentation application.

7. The system of claim 4, wherein the graphical user interface further comprises an active view designator, the active view designator adapted to identify particular ones of the virtual display unit icons that correspond to the plurality of electronic display units within the display group.

8. The system of claim 7, wherein the active view designator is user selectable and positionable within the graphical user interface to identify the particular ones of the virtual display unit icons that correspond to the plurality of electronic display units within the display group.

9. The system of claim 7, wherein at least some of the plurality of the display content icons are selectable and positionable within the active view designator.

10. The system of claim 4, wherein the control instructions comprise one or more of a UDP/IP message or a TCP/IP message.

11. The system of claim 4, wherein each of the plurality of electronic display units within the display group comprises a tablet-type computer having its own operating system and its own IP address unique within the system.

12. An system comprising:
one or more processors; and
one or more computer-readable tangible media encoding one or more instructions that, when executed collectively by the processors;
generate a graphical user interface comprising:
a plurality of virtual display unit icons, one or more of the virtual display unit icons each corresponding to a particular electronic display unit;
a plurality of display content icons, each of the display content icons corresponding to a display content file and representing one or more steps or processes in a manufacturing process flow, one or more of the display content icons being user selectable and positionable within the graphical user interface with respect to one or more of the virtual display unit icons; and
an active view designator for identifying a first group of the virtual display unit icons; and
in response to a user positioning a plurality of particular virtual display unit icons in the first group of the virtual display unit icons each within a predetermined distance of a particular display content icon within the graphical user interface, generate one or more first control instructions for defining display content for the particular electronic display units corresponding to the first group of the virtual display unit icons identified by the active view designator that corresponds to the display content icons in the first group of virtual display unit icons.

13. The system of claim 12, wherein:
the active view designator is repositionable to identify a second group of the virtual display unit icons; and
the one or more instructions, when executed collectively by the processors, generate second control instructions for defining display content for the particular electronic display units corresponding to the second group of the virtual display unit icons identified by the active view designator, that corresponds to the display content icons in the second group of virtual display unit icons.

14. The system of claim 12, wherein both the first control instructions and the second control instructions comprise a TCP/IP message.

15. A method comprising:
initiating a first application instance on a controller;
transmitting, from the controller, control instructions for defining display content for a display group comprising a plurality of tablet-type computers;
modifying display content for at least one tablet-type computer;
storing the modified display content for the at least one tablet-type computer;
generating a graphical user interface comprising:
a plurality of virtual display unit icons, one or more of the virtual display unit icons each corresponding to a particular tablet-type computer; and a plurality of display content icons, each of the display content icons corresponding to a display content file, one or more of the display content icons being user selectable and positionable within the graphical user interface with respect to one or more of the virtual display unit icons; and wherein modifying the display content for the at least one tablet-type computer comprises, in response to a user positioning a particular virtual display unit icon corresponding to the at least one tablet-type computer within a predetermined distance of a particular display content icon within the graphical user interface, generating control instructions to modify the display content for the at least one tablet-type computer such that the display content for the tablet-type computer corresponds to the particular display content icon associated with the particular virtual display unit icon corresponding to the at least one tablet-type computer.

16. The method of claim 15, wherein the one or more control instructions comprise one or more of a UDP/IP message or a TCP/IP message.

* * * * *

UNITED STATES PATENT AND TRADEMARK OFFICE
CERTIFICATE OF CORRECTION

PATENT NO. : 7,565,616 B2 Page 1 of 1
APPLICATION NO. : 11/445886
DATED : July 21, 2009
INVENTOR(S) : Gregory J. Buchmann It is certified that error appears in the above-identified patent and that said Letters Patent is hereby corrected as shown below:

In column 11, line 22, in Claim 4, delete "An" and insert -- A --, therefor.

In column 12, line 11, in Claim 12, delete "An" and insert -- A --, therefor.

In column 12, line 50, in Claim 13, delete "designator," and insert -- designator --, therefor.

Signed and Sealed this

Twenty-fourth Day of November, 2009

David J. Kappos
*Director of the United States Patent and Trademark Office*